US011928549B1

(12) United States Patent
Harvill et al.

(10) Patent No.: US 11,928,549 B1
(45) Date of Patent: Mar. 12, 2024

(54) SYSTEMS AND METHODS FOR TRACKING AND MONITORING PRODUCTS USING EMBEDDED THRESHOLD INDICATORS

(71) Applicant: Provindre, Inc., Santa Clara, CA (US)

(72) Inventors: Leslie Young Harvill, Olympia, WA (US); David Gross, Palo Alto, CA (US); E. Paul Salcedo, Santa Clara, CA (US)

(73) Assignee: Provindre, Inc., Santa Clara, CA (US)

( * ) Notice: Subject to any disclaimer, the term of this patent is extended or adjusted under 35 U.S.C. 154(b) by 0 days.

(21) Appl. No.: 17/970,738

(22) Filed: Oct. 21, 2022

(51) Int. Cl.
*G06K 7/14* (2006.01)
*G06K 1/12* (2006.01)

(52) U.S. Cl.
CPC .......... *G06K 7/1417* (2013.01); *G06K 1/123* (2013.01)

(58) Field of Classification Search
CPC .............................. G06K 7/1417; G06K 1/123
USPC ...................................................... 235/462.1
See application file for complete search history.

(56) References Cited

U.S. PATENT DOCUMENTS

| | | | |
|---|---|---|---|
| 2002/0085164 A1* | 7/2002 | Stanford-Clark | G01K 3/00 349/167 |
| 2005/0139686 A1* | 6/2005 | Helmer | G06K 19/06009 235/487 |
| 2008/0290174 A1* | 11/2008 | Norrby | B41M 5/41 235/487 |
| 2010/0219235 A1* | 9/2010 | Nemet | G06Q 10/08 235/375 |
| 2017/0193260 A1* | 7/2017 | Prusik | G06K 19/06037 |
| 2019/0385115 A1* | 12/2019 | Biermann | G01K 1/024 |
| 2021/0034831 A1* | 2/2021 | Abdo | G01K 3/04 |
| 2021/0034933 A1* | 2/2021 | Abdo | G06K 7/14 |
| 2022/0343125 A1* | 10/2022 | Nemet | G06K 7/1417 |

* cited by examiner

*Primary Examiner* — Daniel A Hess
(74) *Attorney, Agent, or Firm* — Goodwin Procter LLP

(57) ABSTRACT

Methods and systems as described herein provide for retrieving information about a product using a composite tag affixed to the product and that is optically scanned by a scanning device at any point throughout the supply chain of the product. The process includes retrieving an image comprising an optically encoded tag and an irreversible threshold indicator and sensing a characteristic of the irreversible threshold indicator, which indicate a state change of an environment to which the product was exposed. The data encoded in the optically encoded tag is resolved to instructions to query a web service, wherein the web service provides data regarding the product in response to receiving the query and the product data is presented in combination with information for interpreting the state change on the product.

30 Claims, 12 Drawing Sheets

| Version | Number of alignment patterns | Row/Column coordinates of center module | | | | |
|---|---|---|---|---|---|---|
| 1 | 0 | - | | | | |
| 2 | 1 | 6 | 18 | | | |
| 3 | 1 | 6 | 22 | | | |
| 4 | 1 | 6 | 26 | | | |
| 5 | 1 | 6 | 30 | | | |
| 6 | 1 | 6 | 34 | | | |
| 7 | 6 | 6 | 22 | 38 | | |
| 8 | 6 | 6 | 24 | 42 | | |
| 9 | 6 | 6 | 26 | 46 | | |
| 10 | 6 | 6 | 28 | 50 | | |
| 11 | 6 | 6 | 30 | 54 | | |
| 12 | 6 | 6 | 32 | 58 | | |
| 13 | 6 | 6 | 34 | 62 | | |
| 14 | 13 | 6 | 26 | 46 | 66 | |
| 15 | 13 | 6 | 26 | 48 | 70 | |
| 16 | 13 | 6 | 26 | 50 | 74 | |
| 17 | 13 | 6 | 30 | 54 | 78 | |
| 18 | 13 | 6 | 30 | 56 | 82 | |
| 19 | 13 | 6 | 30 | 58 | 86 | |
| 20 | 13 | 6 | 34 | 62 | 90 | |
| 21 | 22 | 6 | 28 | 50 | 72 | 94 |
| 22 | 22 | 6 | 26 | 50 | 74 | 98 |
| 23 | 22 | 6 | 30 | 54 | 78 | 102 |
| 24 | 22 | 6 | 28 | 54 | 80 | 106 |
| 25 | 22 | 6 | 32 | 58 | 84 | 110 |
| 26 | 22 | 6 | 30 | 58 | 86 | 114 |
| 27 | 22 | 6 | 34 | 62 | 90 | 118 |

Fig. 6

SYSTEMS AND METHODS FOR TRACKING AND MONITORING PRODUCTS USING EMBEDDED THRESHOLD INDICATORS

TECHNICAL FIELD

The present systems and methods are directed to tracking products through a supply chain, and, in more particular, using threshold indicators and optical coded tags to capture and provide information regarding the products as they travel through the supply chain.

BACKGROUND

Currently, products may encounter several environmental risks during packing, transportation, and storage of the products, which in turn may affect the quality of the product. Risk factors may include environmental factors such as temperature, humidity, and/or light exposure, as well as temporal factors such as age or time spent at any one location. In order to reduce the risks of damage to the products, methods are used to monitor and track the shipping containers and the storage environments in which the products travel or are store. However, these methods do not monitor and track the individual products under the influence of these risk factors during transportation and do not provide any means for communicating this information to consumers purchasing the product at a point of sale. Therefore, there is a need to find an effective way to monitor and track the products under the influence of these risk factors during transportation and to provide this information to consumers.

SUMMARY

Several existing methods have been developed to monitor shipping containers and storage environments in which various products are stored and transported for the purpose of identifying potential damage because of one or more risk factors encountered during packing, transportation, and storage before the products are received by customers. These risk factors may include temperature, humidity, light exposure, or the like. For example, the temperature for storing the products may be higher than a desired value, or the humidity for the products during transportation may be lower than an acceptable value. In some cases, a chain of custody for the products is required by federal or state regulations, however, it is challenging to track a specific, individual product as it encounters one or more environmental effects during its transportation or storage.

For example, certain Internet of Things (IOT) sensors and Near-field communication (NFC) tags with embedded sensors can detect whether products in the same container or vicinity as the tag are exposed to risk factors that may damage the products. However, monitoring and tracking using these methods is not suitable for tracking individual products with a relatively modest per-unit value since these products are more likely to be used with a shipping container containing perishable items. Therefore, there is a need to monitor the products directly and efficiently in addition to communicating the information collected during monitoring to the end customer.

In a first aspect, the invention provides method for manufacturing a device for monitoring an object includes forming a first layer by printing a first array of indicators on a substrate and forming a second layer by printing a second array of indicators on the second layer, then depositing a color development layer over the second layer, the second layer isolating the first layer and the color development layer. An optically coded layer is then imprinted on the color development layer, the optically coded layer including an optical coded tag encoding one or more identifiers for the object, which, in some cases, may be associated with a class of the object, while in other cases may be associated with the individual object.

In some embodiments, the first layer comes into to contact contacts the color development layer after the device reaches a threshold temperature, after the device reaches a threshold humidity and/or after the device is exposed to light for a threshold of time. Once contact is made, the color development layer changes color of the first layer, which may include the first and/or second array of indicators changing color. I some instances, a first and second threshold may be established for temperature, humidity and/or light, and the color development layer may change to a first color when reaching the first threshold, and a second color upon reaching the second threshold. The color change may, in some cases, be a gradient.

In some embodiments, the spatial relationship of the optically coded layer and depositing of the arrays of indicators are arranged in a manner to minimize interference when being scanned or read.

In another aspect, the invention provides a method for retrieving information about a product. The method includes retrieving an image comprising an optically encoded tag (e.g., a QR code) and an irreversible threshold indicator and sensing a characteristic of the irreversible threshold indicators, which indicate a state change of an environment to which the product was exposed. The data encoded in the optically encoded tag is resolved to instructions to query a web service, wherein the web service provides data regarding the product in response to receiving the query and the product data is presented in combination with information for interpreting the state change on the product.

In some embodiments, the irreversible threshold indicators are positioned within the QR code, and in certain cases in a manner as not to interfere with data encoded into the QR code. The characteristic of the one or more irreversible threshold indicators may comprise, for example, a color change, that may be brought about when the product on which the irreversible threshold indicators are placed encounter environmental conditions outside of a defined threshold. The threshold may be a temperature range, a humidity range, and/or exposure to ultraviolet light. In some instances, the data regarding the product comprises one or more of (i) a type of irreversible threshold indicators included with the QR code, and (ii) one or more locations within the QR code where the irreversible threshold indicators are located. The information regarding the impact of the state change on the product may, in some cases, include a set of colors of at least one of the irreversible threshold indicators and an product state associated with each color.

In another aspect, a system for tracking and monitoring environmental effects on a product includes a composite tag comprising an optically encoded tag and irreversible threshold indicators that, when scanned by a scanning device, resolves to a uniform resource locator, wherein the uniform resource locator comprises a data request comprising at least a web address of a central data server and a unique product identifier, and a data service addressable by the uniform resource locator operating at the central data server that receives the data request from the scanning device and in response thereto retrieves, from a central data store, information about the product, wherein the information about the product comprises an indication as to whether the product has been exposed to an adverse environmental effect based at least in part on the state of the irreversible threshold indicator.

In some embodiments, the optically encoded tag is a QR code, and in certain instances the irreversible threshold indicators are positioned within the QR code such as not to interfere with data encoded into the QR code. The information about the product can include a color range of the irreversible threshold indicator, wherein the color range represents changes to a color of the irreversible threshold indicator brought about when the product on which the irreversible threshold indicator encounters environmental conditions outside of a defined threshold. The defined threshold can be a temperature range, a humidity range, and/or exposure to ultraviolet light. In some embodiments, the data regarding the product comprises one or more of (i) a type of irreversible threshold indicators included with the QR code, and (ii) one or more locations within the QR code where the irreversible threshold indicators are located.

These and other objects, along with advantages and features of embodiments of the present invention herein disclosed, will become more apparent through reference to the following description, the figures, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 6 provides a tabular listing of QR code patterns and coordinates that may be used in various embodiments of the invention.

DETAILED DESCRIPTION

Figure 1:
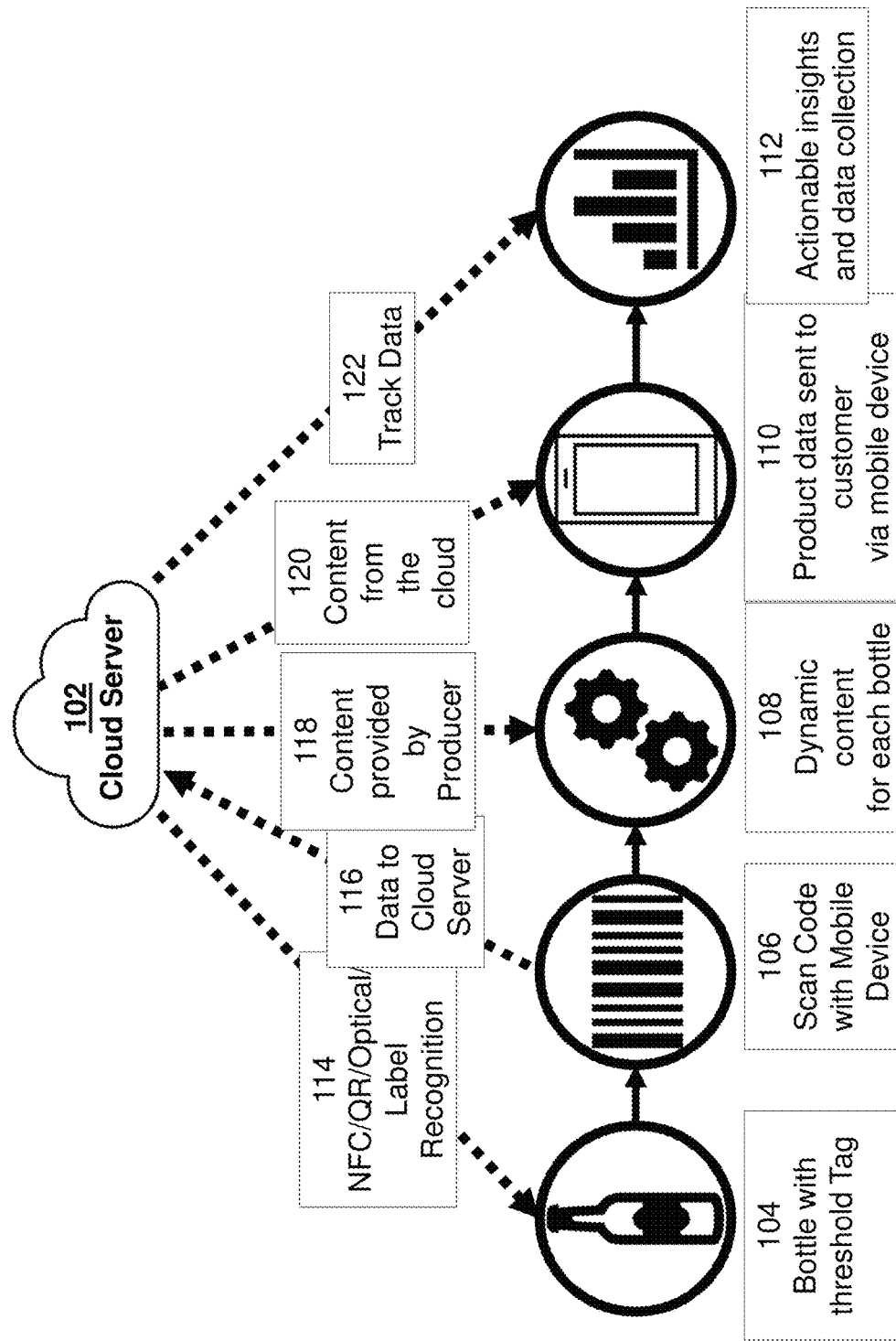
FIG. 1 illustrates the data and information flow among components and participants within the ecosystem in which various embodiments of the invention operate.

It is contemplated that apparatuses, systems, methods, and processes of the claimed invention encompass variations and adaptations developed using information from the embodiments described herein. Adaptation and/or modification of the apparatuses, systems, methods, and processes described herein may be performed by those of ordinary skill in the relevant art.

It should be understood that the order of steps or order for performing certain actions is immaterial so long as the invention remains operable. Moreover, two or more steps or actions may be conducted simultaneously.

With reference to the drawings, aspects and embodiments of the invention will now be described in more detail. The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Several existing methods have been developed to monitor shipping containers and storage environments in which various products are stored and transported for the purpose of identifying potential damage because of one or more risk factors encountered during packing, transportation, and storage before the products are received by customers. These risk factors may include temperature, humidity, light exposure, or the like. For example, the temperature for storing the products may be higher than a desired value, or the humidity for the products during transportation may be lower than an acceptable value. In some cases, a chain of custody for the products is required by federal or state regulations, however, it is challenging to track a specific, individual product as it encounters one or more environmental effects during its transportation or storage.

For example, certain Internet of Things (IOT) sensors and Near-field communication (NFC) tags with embedded sensors can detect whether products in the same container or vicinity as the tag are exposed to risk factors that may damage the products. However, monitoring and tracking using these methods is not suitable for tracking individual products with a relatively modest per-unit value since these products are more likely to be used with a shipping container containing perishable items. Therefore, there is a need to monitor the products directly and efficiently in addition to communicating the information collected during monitoring to the end customer.

Ideally, an approach that serves this need may be inexpensive to manufacture and to apply to an individual product, and, in some cases, allow a user or a consumer to query the product itself and learn the identity and history of an individual product as it traveled through its supply chain. For example, a consumer may validate the identity the product, the manufacture date, location and source of the product, as well as ensure that the product has been handled properly during transport and storage.

Advancements in the availability of image capture and recognition applications on mobile handheld devices have provided an adoption of optical code standards for a variety of applications. But these codes (e.g., bar codes, QR codes, and others) are static, and while they may be able to convey some information about a product (e.g., SKU, price, model number, etc.) they do not reflect any changes in status of the product based on the environmental factors encountered along the supply chain. These optical tags may be used as belongings to a shipping kit unit (SKU) and the optical tags may be registered with one or more authorities. In addition, the optical tags may need to comply with one or more regulations, for example, Code 39, Code 128, Interleaved 2 of 5, Universal Product Codes, International Article Code, PDF 417, Data Matrix Codes, and Quick Response Codes. The tag may be visible by a camera or a scanning system, and then the tag may be de-coded by one or more software associated with a reader, reader application, or integrated with an application using a programming interface supported by a device manufacturer.

Further, irreversible threshold indicators (IRTIs) may be used on shipping packages or containers to capture information at a container level. For example, one or more IRTIs sensors may be used to capture and hold a triggered state based on a pre-designed sensed input encountered during storage or shipping. The pre-designed sensed input may be, for example, temperature over a certain value and may be captured by electrical IRTIs, thermal IRTIs or fuses that are part of an integrated circuit. In some examples, the IRTIs may also be re-settable. The IRTIs may also be integrated with NFC tags.

IRTIs may be also take the form of non-electrical, non-mechanical devices that use chemical or physical properties of layered materials to change the appearance of the cards or the stickers when a sensing value that is outside a defined threshold range.

In one embodiment, the devices and methods described herein may include integrating and/or embedding one or more IRTIs within an optical tag (e.g., a QR code) on a specific, individual item. In some cases, integration of the IRTI with the optical tag may dictate the use of certain materials and/or specifications for the IRTI, and in some cases for the optical tag to be resolved and met. In addition, the integration of the IRTI with the optical tag may include additional optical sensing or scanning techniques operable on the users scanning device, as well as back-end services to resolve the code generated by scanning the optical tag to identify the product being tracked and the characteristics of the IRTIs associated with the optical tag.

In one embodiment, the combined optical tag and IRTIs may be an irreversible sense threshold tag (ISTT). The ISTT provides a method of tracking a product and determining the environmental conditions to which the tagged product has been exposed.

Passive Near-field communication (NFC) techniques may also be used as a digital tagging method to track products and to detect elements of product's environment. Passive NFC tags (e.g., those described in ISO/IEC 18092 and ISO/IEC 21481 standards) may include an antenna and a chip which may be passively powered by energy accumulated by the antenna. The chip may also include irreversible threshold sensors (e.g., thermal fuses, humidity fuses, or the like) that may be set to a threshold that may indicate environmental elements that the product encounters during storage and shipping.

In one embodiment, the optical codes may be used as a method to track products. The optical codes may adhere to specified metrics for readability using scanners, devices, and software, such as the ISO/IEC 15415:2011 barcode standard for ISTT tags includes. Particularly, a barcode may be used where portions of the pattern may be missing in two-dimensional (2D) tags. In this case, redundancy may be encoded in the tag based on the specification. In some examples, a quick result code tag (e.g., ISO/IEC 18004: 2015) may provide the portions of the encoded pattern that are missing based on the redundant encoding. In some embodiments, the optical codes may be viewed as a mechanism to achieve a method needed to assemble an ISTT.

While irreversible threshold indicators may be a device to detect a shipping container that has been exposed to adverse conditions, in some embodiments of the invention IRTIs may be used to monitor that a package or container has been stored according to specified environmental conditions prior to use, such as heat, cold, humidity, UV light, radiation, etc.

In one embodiment, there are several methods to enhance the ISTT. For example, universally unique identifiers (UUID) may generate unique labels or identifiers, and the UUIDs may be integrated with one or more ISTTs to allow for the identification of the specific product in conjunction with gaining information from the ISTT.

FIG. 1 provides a data flow and process diagram illustrating the tracking and monitoring of individual products. In one embodiment, the products being tracked and monitored may be a consumer product such as a bottle of wine 104, however the example of a bottle of wine is only one exemplary use case, and these same methods and techniques may be applied to other foods and beverages, works of art, electronics, chemicals, paints, detergents, and the like. In this example, a cloud server 102 can provide a centralized repository and processing platform to generate identifying codes, store manufacturer and product information, and respond to queries from consumers regarding the products. In this particular example, a wine bottle 104 is augmented with a threshold tag that may include an NFC tag, a quick response (QR) code tag, and/or an optical tag, (collectively a "composite tag") 114 that can be scanned by a camera, hand-held scanner or other similar device.

Once the composite tag has been imprinted on or otherwise added to wine bottle 104 (e.g., on the label), a mobile device may be used to scan and detect of bar code 106 on the wine bottle 104. In one particular version, the scanning is done using a mobile application residing on the scanning device, that, once it scans the code (106) on the bottle 104, information is transmitted 116 to the cloud server 102 in the form of a query requesting information about the wine.

In response, the cloud server 102 may send data back to the mobile device, which may include content provided by the producer (e.g., the vineyard, bottler, retailer, etc.) 118. In some cases, the content may include dynamic content related to the bottle 104, which may change over time. For example, the content may include dates and times of bottling, locations, and other supply chain information. The content may also include data 120 generated at the cloud server 120 that may include additional product related data which may also be sent to the consumer via a mobile application 110, for example. In instances where the product is a bottle of wine, additional product data may include recipes, pairings, and other curated and/or user generated content about the wine.

In some cases, additional tracking data may be captured about the consumer and/or the product in the form of marketing and demographic data which may be used to provide actionable insights and other tracking data related to the product being tracked. Further, data captured from the composite label regarding the product journey through the supply chain such as environmental characteristics, transit and storage times, and other similar tracking data 122 may be collected and used in conjunction with the consumer data to provide actionable insights to the producers and retailers of the product.

The encoding, scanning, and data sharing provided by the systems and techniques described herein are effected using the composite tag that includes a combination of one or more irreversible sense threshold tags and an optically encoded image, such as a QR code. The composite tag may be created by integrating a standard IRTI with a QR code and/or integrating an array of irreversible threshold indicators with a QR code when the IRTI is manufactured.

In certain embodiments, the ISTTs may need to conform to one or more requirements. First, the changeable IRTI areas in the tag should conform to specifications of not interfere with the optically coded tag, so that the tag may be functional for compliant scanners and readers. Second, the chosen optical coded tag specifications should tolerate some errors in encoded data to accommodate the changeable optical characteristics of the IRTI areas. Third, the IRTI areas should follow a consistent pattern and placement within specified areas of the optically coded tag, so that detection software can locate the IRTI areas and recognize each IRTI. Fourth, the placement of the IRTI should have a known relationship to alignment features of the optical coded tag. Fifth, the encoded data in the optically coded tag should include a unique identifier as to facilitate the association of the product being tracked to its particular characteristics. The encoded data in the optical coded tag may also include encoded data that recognizes specific types of IRTIs that may be placed in or on the tag, so optical states of the specific types of IRTI may be read and interpreted. Sixth, the service encoded in the optical coded tag should record creation of each ISTT, configuration of the embedded IRTI, and each monitored object, product, or device.

Figure 2:
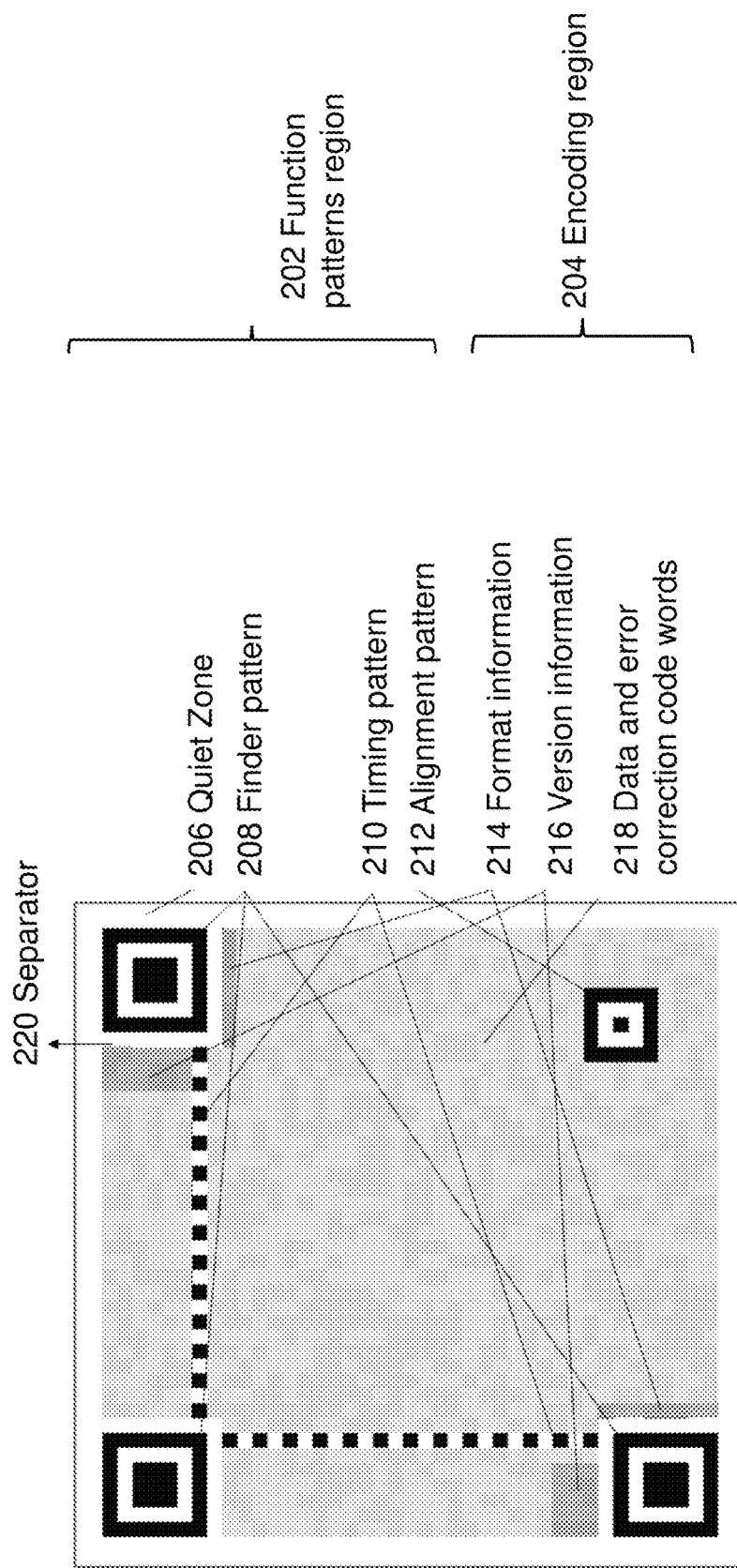
FIG. 2 illustrates the components of an exemplary QR code that may be used in various embodiments of the invention.

FIG. 2 illustrates a quick response code (QR code) structure that meets these constraints.

In FIG. 2, the QR code may include two regions. A first region is a function patterns region 202, and a second region is an encoding region 204. The function patterns region 202 includes a quiet zone 206, a finder pattern 208, a timing pattern 210, and an alignment pattern 212. The encoding region 204 includes format information 214, version information 216, and data and error correction code words 218. The QR code may be a type of matrix bar code. The bar code may be a machine-readable optical label that include information about the item to which the QR code is attached.

In the function patterns region 202, the quiet zone 206 may be an area that has no pattern, which may be used as a reference zone. The finder pattern 208 may include three identical structures that are in all corners of the QR code except the bottom right corner. Each pattern may be based on a matrix of black modules surrounded by white modules. The finder pattern 208 enables a decoder software to recognize the QR code and determine the correct orientation.

In the function patterns region 202, the separator 220 may be used to separate the finder pattern 208 from the actual area. The separator 220 may include a width of one pixel and improve the recognizability of the finder pattern 208. The separator 220 may usually be white.

In the function patterns region 202, timing pattern 210 may be used to enable the decode software to determine the width of a single module. The timing pattern 210 may include white and black alternating patterns. The alignment pattern 212 may be used to support the decoder software in compensating for moderate image distortions.

In the encoding region 204, the format formation 214 may be next to the separators 220 and store information about error correction level of the QR code and the chosen masking pattern. The version information 216 may be used to indicate the size of the QR code. The data and the error correction code words 218 may include data and error correction converting into a bit stream and being stored in a larger bit, and the larger bit may also be called code words.

In one embodiment, integration of an ISTT with the QR code meets the particular specifications of the QR code tag that the ISTT is being used with as well as embedded and, in some cases, pre-designated locations within the QR code for placement of one or more IRTIs. In this instance, the one or more IRTIs include features of the QR code tag which have data and error correction code words 218 as shown in FIG. 2. Further, the IRTI may be placed in the known location within the QR code tag. In addition, the color of the substrate of the QR code tag and the printed color of the QR code tag may also be determined by a standard specification of the QR code tag.

In one embodiment, the QR code may be printed on an irreversible threshold indicator to form an ISTT. For example, an array of irreversible thermal threshold indicators with a threshold of 30 degrees Celsius may be manufactured on an adhesive substrate. A set of QR code tags may be aligned and printed on this array of irreversible thermal threshold indicators. The error correction level of the encoded data may allow variable optical characteristics of active portion of the irreversible thermal threshold indicators. Since the size of the irreversible thermal threshold indicators is fixed, the size of the printed QR code and the spacing between the irreversible thermal threshold indicators may also need to be fitted into the area that the irreversible thermal threshold indicator covers under a range of acceptable error defined by the error correction level.

For example, a manufacturer may create a round irreversible threshold indicator with a diameter of 12 mm. The data to be encoded in the QR code may be in the form as 123e4567-e89b-12d3-a456-426614174000.istt_service-.com, which is shown by the QR code in FIG. 3.

The characteristics of each version of a QR code may be found in table 1, "Codeword capacity of all versions of QR Code," ISO/IEC 18004, 2015. The encoding for example is a version 6 QR code at error correction level M, which provides a capacity of 172 codewords. The size of the version 6 QR code has 41×41 modules. The version 6 QR code has a quiet zone 206 of 4 modules wide surrounding the QR code, so the size of the entire QR code is 49×49 modules. It is noted that because of uniform length of the UUID, the QR code version and size may be consistent for any given service.

The version 6 QR code may have no alignment pattern 212 in the center of the 41×41 pattern. The QR code may be placed so the module may be located at the center of the irreversible threshold indicator. Error correction level M may accept up to 30% error within the data and error correction code words 218.

For example, the version 6 code may have 1,383 data modules, so the encoding may accept an error of 414 code words. A maximum radius (R) within this error of a number of code words (N) may be calculated using the following equation:

$$R=\sqrt{(N/\pi)}$$

Therefore, the maximum radius within this error of 414 code words is 11.479, which may be error correction headroom for the QR code decoding. In some examples, a maximum radius (R) may produce a number (N) of code words using the following equation:

$$N=\pi R^2$$

Therefore, the number of code words or modules for a radius of 9 is 254 modules. The version 6 code may have 1,383 data modules, then the error tolerance is 18%, which is calculated by the number of modules within the error radius dividing the total modules.

Figure 4:
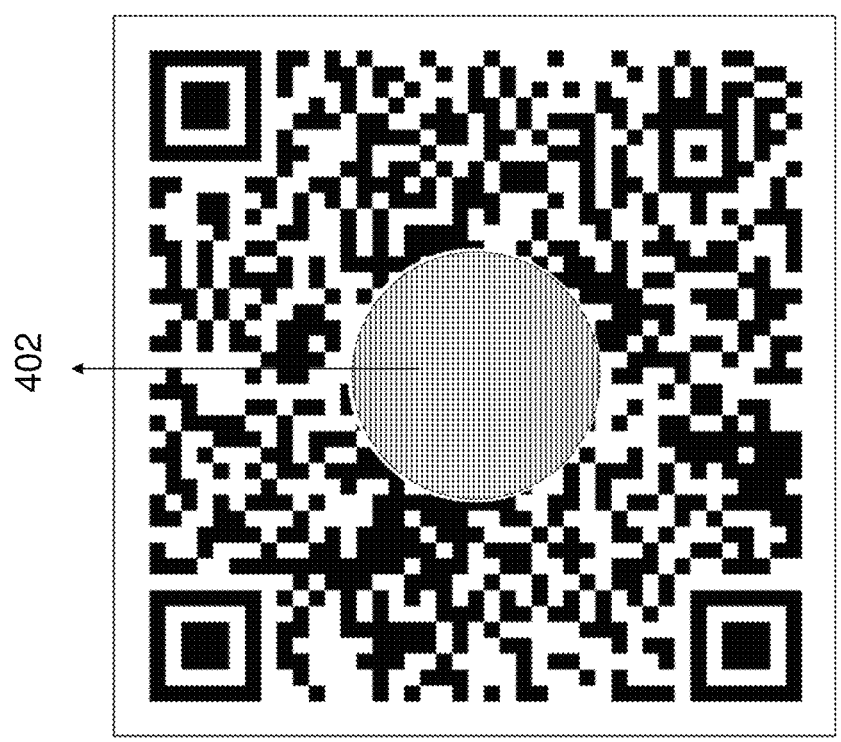
FIG. 4 illustrates an exemplary QR code with an irreversible threshold indicator included within the code that may be used in various embodiments of the invention.

Since error correction level M allows for 30% error, and the coverage of data modules by the IRTI is 18%, this leaves a 12% detection error rate for scanning. There will need to be a bleed or offset of the IRTI alignment. A diameter of 16 modules will size the QR code module at 0.75 mm and size the entire 41×41 module QR code at ~31 mm with a quiet are border of 3 mm for a full ISTT size of 37 mm. With a die cut bleed of 3 mm, the 12 mm IRTIs may be manufactured on a 40 mm×40 mm array and post processed with the Version 6 QR Codes generated with a module size of 0.75 mm and centered within the 40 mm×40 mm array to produce completed composite tags. FIG. 4 shows such a placement. In certain embodiments, the QR code may be encoded with a UUID and a service uniform resource locator (URL) to allow for resolution to a website or other web service that provides the functionality described above with reference to FIG. 1.

In some cases, the ISTT may include integration of an array of irreversible threshold indicators and a QR code, and be custom manufactures for a particular implementation.

Figure 5:
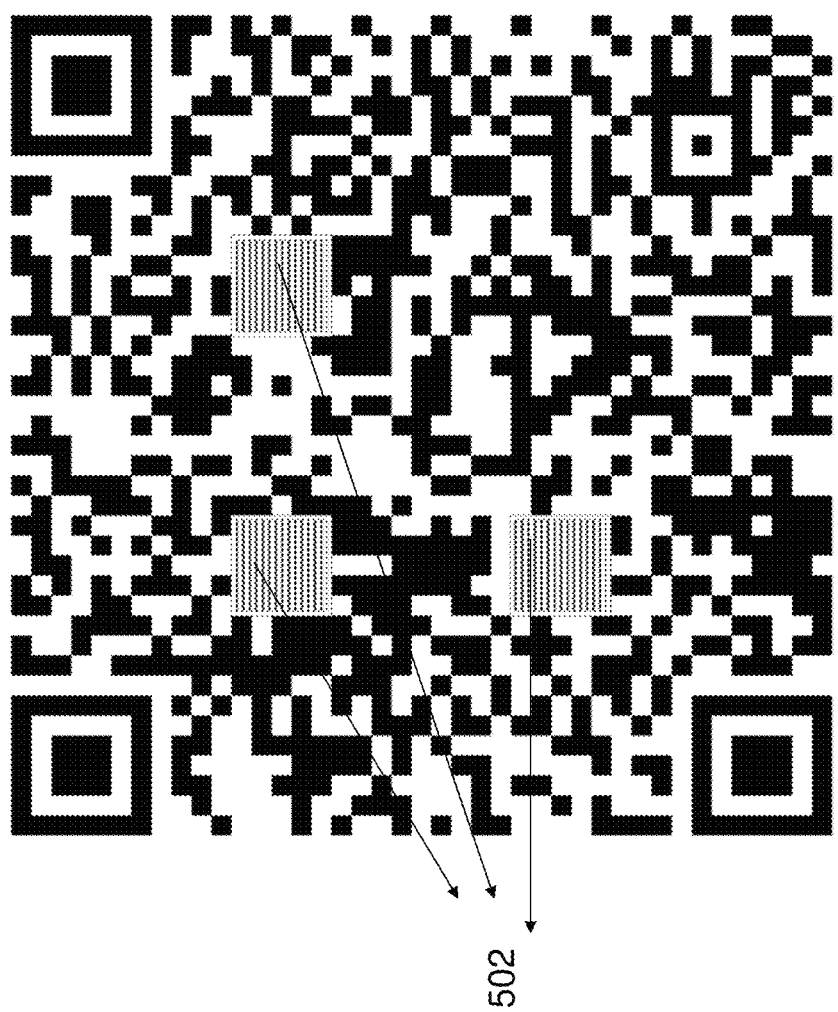
FIG. 5 illustrates an exemplary QR code with multiple irreversible threshold indicators included within the code that may be used in various embodiments of the invention.

In one particular embodiment, in order to have an easier detection during scanning of the QR code and where multiple IRTIs are embedded within a QR code, the IRTIs are arranged in a known close relationship to a finder pattern 208. For instance in the case of a version 6 QR code, each IRTI may be offset 3 modules from the horizontal and vertical borders of the finder patterns. If the number of IRTI tags is larger than a defined threshold value, the IRTIs may be arranged in a known close location to an alignment pattern 212. FIG. 5 illustrates a QR code with three integrated custom irreversible threshold indicators embedded within the QR code.

In one embodiment, if fewer than three IRTIs are placed within the QR code, the IRTI may be sized to be 5×5 modules, which is the size of an alignment pattern 212. The IRTI may also be positioned 4 modules from a finder pattern 208 toward the center of the QR code. In one embodiment, if more than three IRTIs are required, the encoded data may be increased, and the center of each IRTI in a 5×5 IRTI array may be aligned with centers of areas between alignment pattern 212.

Referring to FIG. 6, a table of a comparison of different versions of QR codes is shown. In certain embodiments, based on the table in FIG. 6, row and column coordinates of center modules of alignment patterns 212 are indicated. Because the IRTI is placed in the center of the modules between the alignment patterns, it will need to fit between the row and column coordinates found set forth in FIG. 6. The row and column count for the IRTIs may, for example, be calculated by counting the number of row/column coordinates for the version of the QR code and subtracting one. For instance, version 7 has row/column locations at 6, 22, and 38. The row and columns for IRTIs will be in between these at ((6+22)/2) and ((22+38)/2) or 14, Since these are a square 2×2 matrix this gives 4 IRTIs at (14, 14), (14, 30), (30, 14) and (30, 30). Therefore, the QR codes from the version 7 to version 13 may have a maximum of 4 IRTIs. The QR codes from the version 14 to version 20 may have a maximum number of 9 IRTIs. The QR codes from version 21 to 27 may have a maximum number of 16 IRTIs.

Figure 7:
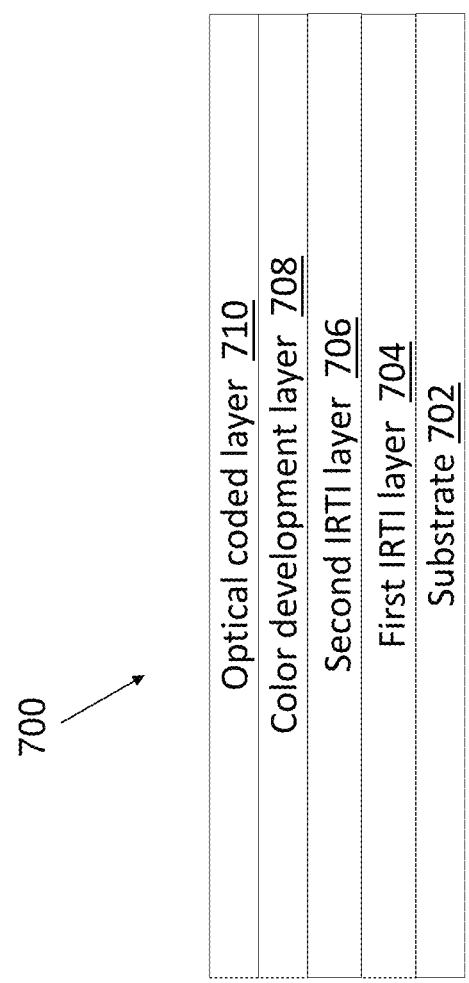
FIG. 7 illustrates various printed layers of a QR code and an irreversible threshold indicator included that may be used in various embodiments of the invention.

Referring to FIG. 7, an exemplary ISTT device 700 including an optical coded layer, two IRTI layers, a color development layer, and a substrate is shown, and may be used with the QR code as described above. The ISTT device 700 includes a substrate 702, a first IRTI layer 704, a second IRTI layer 706, a color development layer 708, and an optical coded layer 710.

The substrate 702 may be, but not limited to, a piece of paper. The substrate 702 may or may not have a coating. The substrate 702 may use a color which sufficiently contrasts with the color of the optical coded layer 708, the color of the first IRTI layer 704 after a state transition, and the color of the second IRTI layer 706 after a state transition. For example, the ISTT device 700 may be used to indicate that the tag with the ISTT device 700 on the product may undergo a state change when the product to which it is affixed is exposed to high temperature.

The first IRTI layer 704 may be printed with a material composed of wax or oil. A dye may be used to provide one or more colors for the wax or the oil, so that the first IRTI layer has a specific color, referred to as an indicator color. The wax or the oil may have a glass-transition temperature similar to a threshold temperature of the IRTIs.

The second IRTI layer 706 may be printed with a UV-cured ink. The second IRTI layer 706 may be printed with a white pattern matrix that forms a barrier, which in some cases may be porous. In some examples, the white pattern matrix may include unprinted areas which accounts for 30% of the area of the second IRTI layer 706. The unprinted areas may include hollow circles which have 0.005 inch in diameter. The second IRTI layer 706 may have a thickness of 0.001 inch.

The color development layer 708 may be printed with wax or oil in its solid state. The wax and the oil may have a glass-transition temperature similar to a threshold temperature of the IRTIs. The color development layer 708 may be translucent and the color development layer 708 may have no dye added.

The optical coded layer 710 may be printed with a UV-cured ink. A color of the UV-cured ink may be different than the color of the substrate 702 and the color of the UV-cured ink may be chosen to meet ISO/IEC 18004:2015 specification. The optical coded layer 710 may use the UV-cured ink to print the QR code discussed above in FIG. 3. The optical coded layer 710 may be transparent over the first IRTI layer 704 and the second IRTI layer 706 for durability.

Figure 8:
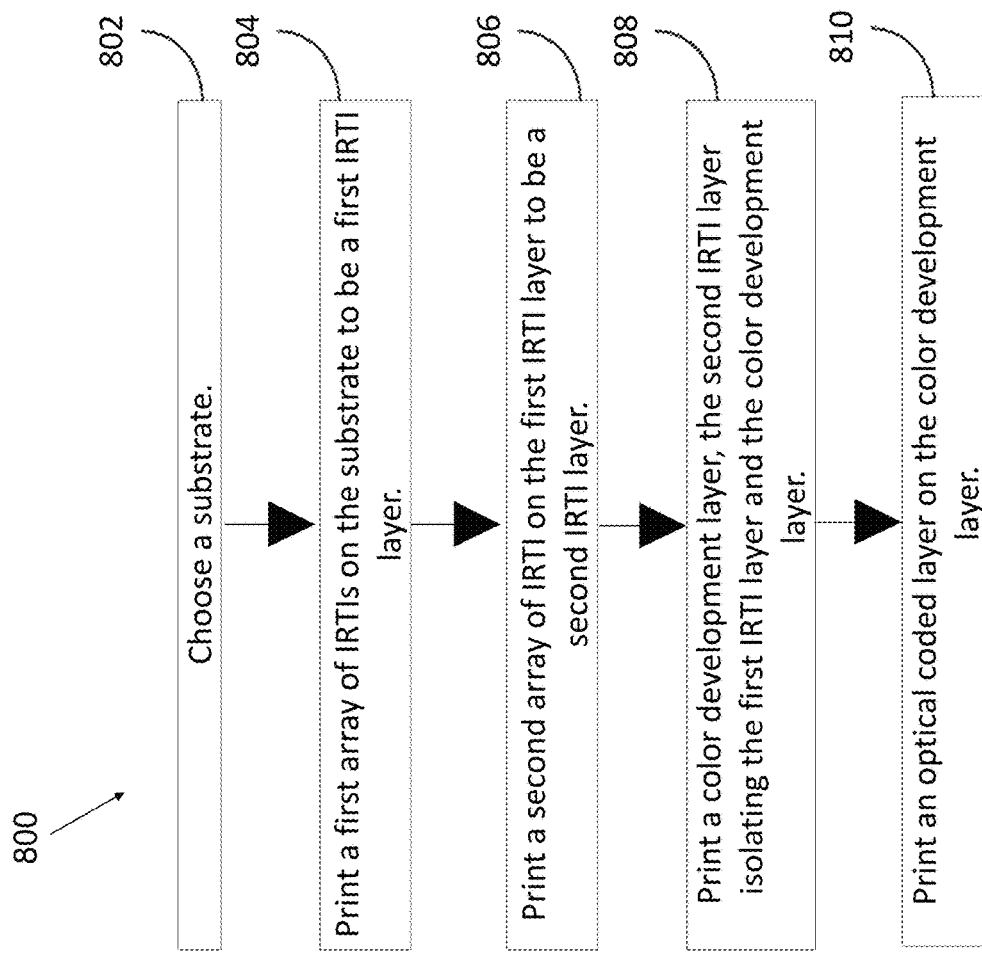
FIG. 8 is a flow chart describing steps for printing a composite QR code and irreversible threshold indicator according to various embodiments of the invention.

Referring to FIG. 8, a process flow 800 of manufacturing the ISTT device 700 is shown, according to an embodiment of the present disclosure.

Figure 3:
FIG. 3 illustrates an exemplary QR code that may be used in various embodiments of the invention.

At step 802, a substrate 702 is chosen as a first layer with a proper color for the QR code in FIG. 3. The color of the substrate 702 may have a sufficient contrast with the color of the IRTI after the IRTI changes its color when the IRTI reaches the threshold temperature. The color of the substrate 702 may be scannable by a user's camera or other similar scanner or software application to detect an event such as a state change.

At step 804, a first array of IRTIs are printed on the substrate 702 as the first IRTI layer 704. As discussed above, wax or oil may be used in the first IRTI layer 704 when printing the first array of IRTIs. A dye may be used for providing a color for the wax and the oil, so that the first array of IRTIs may have the color from the dye.

At step 806, a second layer of IRTIs are printed on top of the first IRTI layer 704 in the step 804 as a second IRTI layer 706. The second array of IRTIs may be used to isolate the substrate 702 and the first IRTI layer 704 in the steps 802 and 804 before the device 700 reaches the IRTI threshold temperature. After the device 700 reaches the IRTI threshold temperature, the second array of the IRTIs may allow the substrate 702 and the first IRTI layer 704 to combine after the device 700 reaches the IRTI threshold temperature.

At step 808, a color development layer 708 is printed on the second IRTI layer 706. As discussed above, the color development layer 708 may use wax or oil having a glass-transition temperature similar to the IRTI threshold temperature. Before the device 700 reaches the IRTI threshold temperature, the color development layer 708 is separated from the first IRTI layer 704 by the second IRTI layer 706 since the second IRTI layer 706 acts as an isolation layer. After the device 700 reaches the IRTI threshold temperature, the color development layer 708 interacts with the first IRTI layer 704 since the second IRTI layer 706 does not act as an isolation layer. The interaction between the color development layer 708 and the first IRTI layer 704 further produces a color change.

At step 810, an optical coded layer 710 is printed on the color development layer 708, which includes data encoded in the QR code and the QR code is aligned with the first IRTI layer 704, the second IRTI layer 706, and the color development layer 708.

Figure 9:
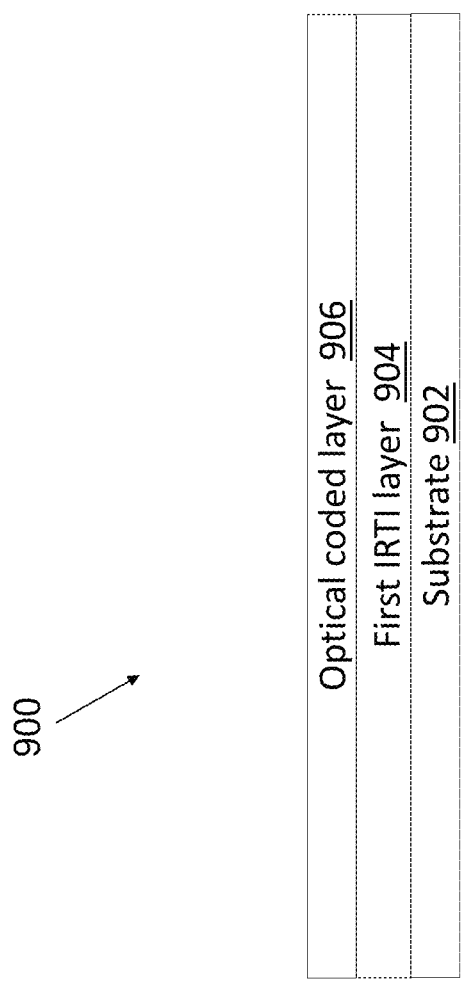
FIG. 9 illustrates various printed layers of an irreversible threshold indicator included that may be used in various embodiments of the invention.

Referring to FIG. 9, an embedded IRTI device 900 including an optical coded layer, a IRTI layer, and a substrate is shown.

In one embodiment, the embedded IRTI device 900 may be used to indicate that the tag with the embedded device 900 on the product was be exposed to light. The embedded IRTI device 900 includes a substrate 902, a IRTI layer 904, and an optical coded layer 906.

The substrate 902 may be, but not limited to, a white paper with brightness-95. The substrate 902 may not have any coating. The substrate 902 may be chosen for color and absorbance that is suitable to produce a significant color difference with the chosen dye. The substrate 902 may use a color which sufficiently contrasts with the color of the optical coded layer 906 such as the color of the QR code. The substrate 902 may also need to use a color that sufficiently contrasts with the color of the IRTI layer 904 after a state transition. The substrate 902 may be chosen to have a compatible absorbency to be printed by a water-based inkjet printer.

The IRTI layer 904 may be printed by a water-based inkjet printer to apply the chosen dye to the IRTI area. The dye may change its color when the embedded IRTI device 900 reaches its threshold condition.

The optical coded layer 906 may be printed using the water-based inkjet printer to apply the QR code in a color that, when compared to the color of the substrate 902, meets the ISO/IEC 18004:2015 specification. The optical coded layer 906 may be aligned with the first IRTI layer 904.

Figure 10:
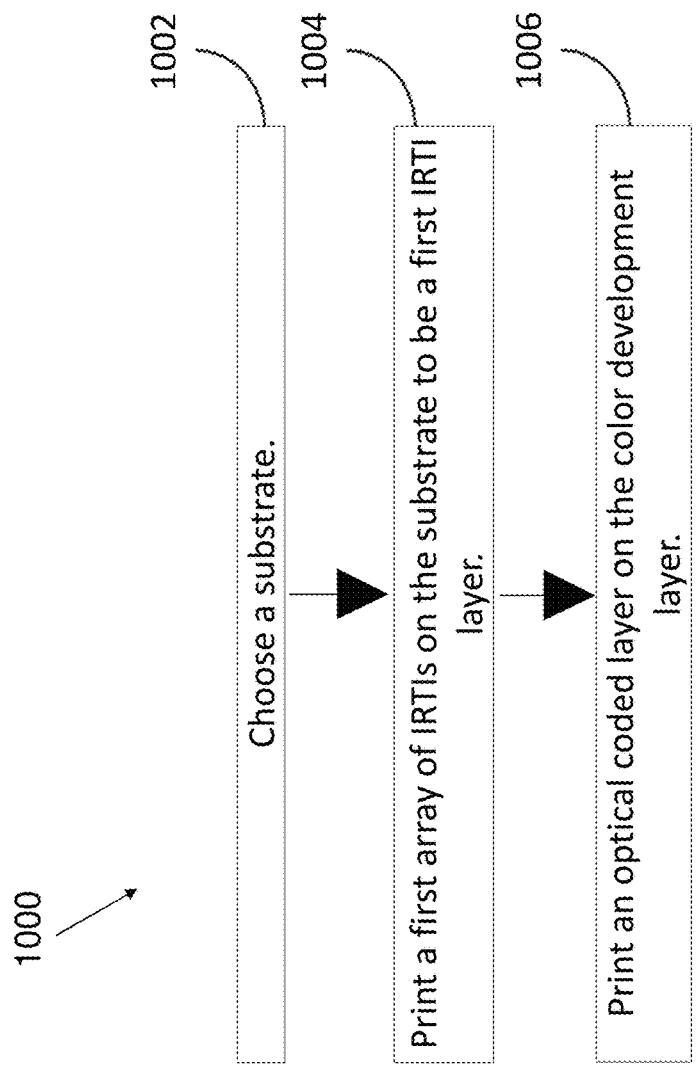
FIG. 10 is a flow chart describing steps for printing a composite QR code and irreversible threshold indicator according to various embodiments of the invention.

FIG. 10 illustrates an exemplary process flow 1000 for manufacturing the embedded IRTI device 1000.

At step 1002, a substrate 902 is chosen as a first layer with a proper color for the QR code as described in FIG. 3. The color of the substrate 902 may have a sufficient contrast with the color of the IRTI after the IRTI changes its color when the IRTI reaches its threshold condition. The color of the substrate 902 may be scannable by a user's camera or scanner or other software application.

At step 1004, an array of IRTIs are printed on the substrate 902 as the IRTI layer 904. As discussed above, wax or oil may be used in the IRTI layer 904 when printing the array of IRTIs. A dye may be used for providing a color for the wax and the oil, so that the array of IRTIs may have the color from the dye.

At step 1006, an optical coded layer 906 is printed on the IRTI layer 904, which includes data encoded in the QR code and the QR code is aligned with the IRTI layer 904. In one embodiment, the embedded IRTI device 900 may indicate that the tag on the product may be exposed to UV-C light. A dye or pigment may be chosen with properties to become substantially transparent when exposed to the UV-C light after the dye or the pigment reach their threshold conditions. In some examples, the dye may be a synthetically produced madder lake red. Several methods may be used to detect a presence of an optical tag. For example, one method may include use of a camera incorporated into a mobile device that takes a picture and detects the QR code within the picture using one or more commercially and/or open source software libraries. For example, a "QRCodeDetector" class in the open-source library may be used in a mobile device or a desktop application to detect and decode the contents of the QR code in the picture taken by the camera of the mobile device. The open-source library may return an array of characters of the encoded data, and the open-source library may further return a code based on the picture. A second method may include rendering a uniform resource locator (URL) embedded in the QR code to facilitate navigation to a web site or service on a browser application.

The detection system may build a matrix to sample the digital image using the coordinates of the modules in the QR code.

The detection system may sample the color of the substrate in the picture with one or more lighting effects by finding a known unprinted position in the QR code. For example, the unprinted position may be (1.5, 1.5) in a module space. The detection system may sample the color of the substrate in the picture with one or more lighting effects by transforming these unprinted positions with the matrix built in the detection system. The detection system may sample the color of the substrate in the picture with one or more lighting effects by sampling the picture at a specific pixel location.

Figure 11:
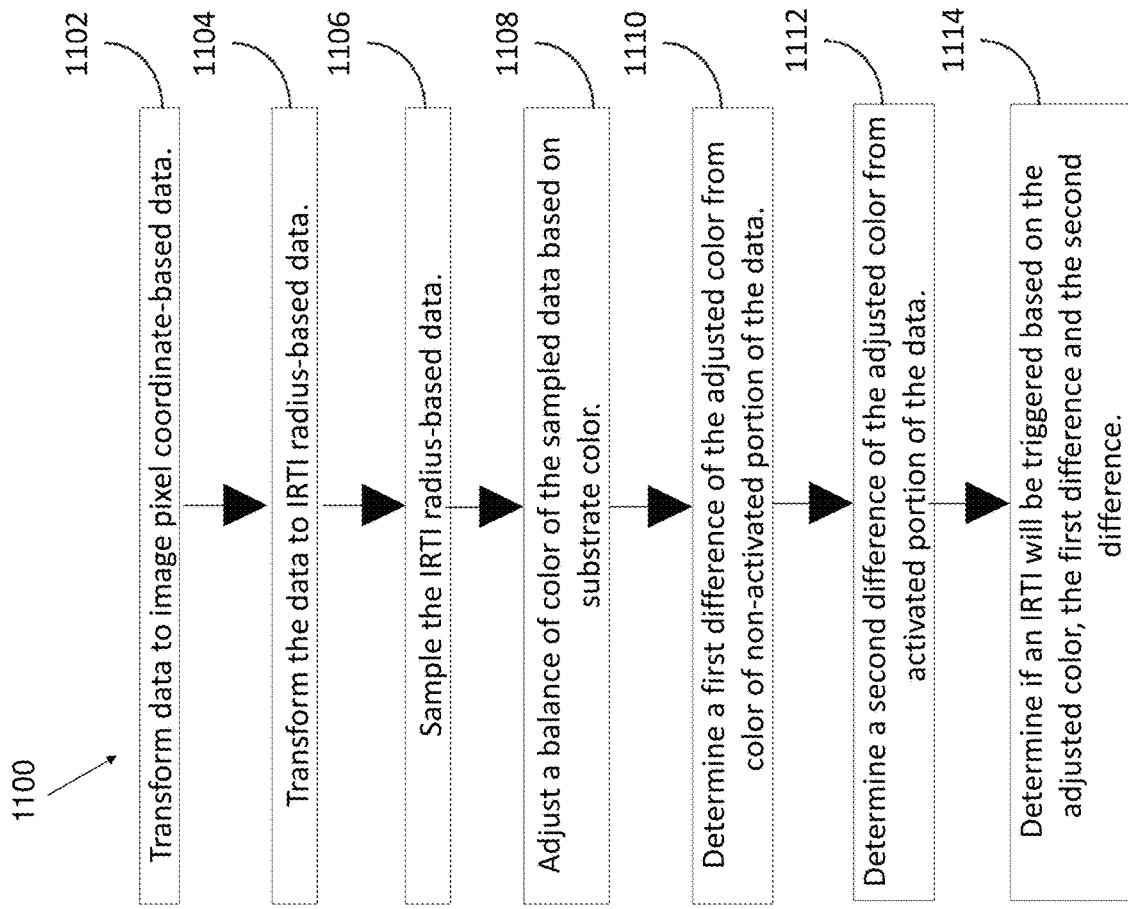
FIG. 11 is a flow chart describing steps for capturing data encoded in a composite tag according to various embodiments of the invention.

FIG. 11 is a flow diagram illustrating the capturing of data from an array of IRTIs, according to various embodiments.

At step 1102, the data from the array of IRTI is transformed to image pixel-coordinate based data. At step 1104, the image pixel coordinate based data is transformed to IRTI radius-based data, which is then sampled (step 1106). At step 1108, the color balance of the sampled data is adjusted based on substrate color and printed QR Code. Methods for adjusting color based on a neutral or white color base may include, in one embodiment, where the substrate color is white and measured at 98% reflectance during manufacture. The QR code is printed in black ink with a measured reflectance of 9% at manufacture. The response curve of the mobile device's camera is known and may be represented by a gamma function. The sampled color of the IRTI may be corrected by using the substrate as a white point, the printed QR code black as a black point and the camera's gamma to transform the color from camera sRGB space to absolute, linear XYZ space.

In one embodiment, activated and non-activated reference colors are stored as linear XYZ color, and may reside in a data store and returned as part of a web query based on the UUID, so a color difference between observed color and reference color may be the Euclidean length between the two colors in XYZ space. A first color difference between the adjusted color and the color of the non-activated portion of the data is determined (step 1110), and a second difference between the adjusted color and the color of the activated portion of the data is determined (step 1112). A determination is then made (step 1114) based on the adjusted color, the first difference, and the second difference.

Figure 12:
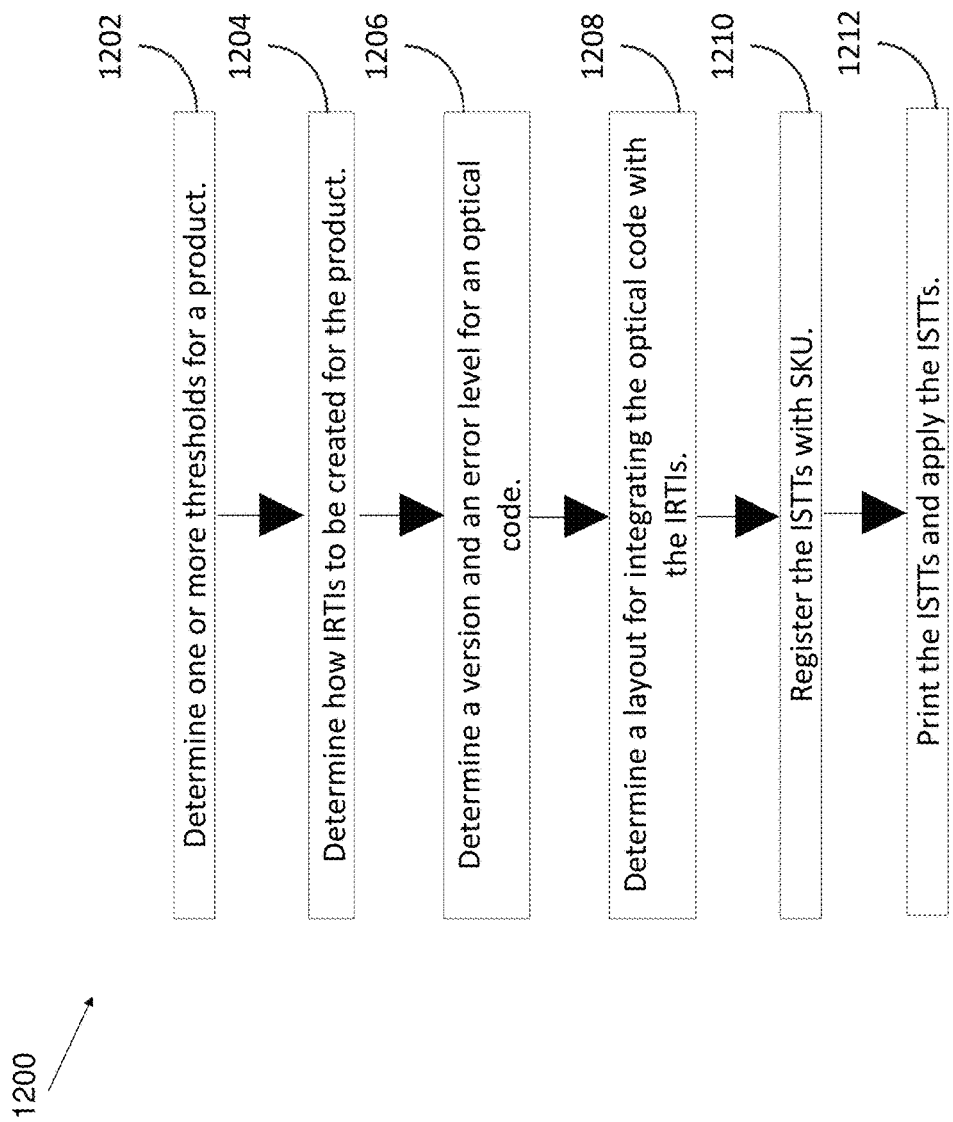
FIG. 12 is a flow chart describing steps for associating one or more characteristics of a product with a composite tag used on the product according to various embodiments of the invention.

FIG. 12 is a flow diagram illustrating various processes for creating and using the ISTTs in conjunction with a QR code in a particular embodiment where the product is a bottle of wine. At step 1202, one or more thresholds for the bottle is determined, such as environmental thresholds that may impact the quality and/or shelf life of the wine. For example, such data may be provided by and collected from a wine manufacturer for a bottle Pinot Noir, which may include various environmental factors such as proximity to water, humidity, smoke, fire, high or low temperature, UV light, etc.

In one embodiment, the preferred temperature for the Pinot Noir having a specific SKU is between 55 and 65° F. Although the Pinot Noir with this specific SKU may be kept at 72° F., the longer that the Pinot Noir is held at this temperature, the more quickly it may age, and if the Pinot Noir is kept at over 80° F., the taste of the Pinot Noir may change. Therefore, a temperature threshold may be set to 82° F. In some cases, UV light and humidity may not be a concern for this product from previous experiment results. Thus, detection of the UV light and the humidity may not be needed for this product.

At step 1204, IRTIs are created for the particular product with the desired thresholds, in this example, an irreversible thermal threshold indicator with a threshold at 82° F. The IRTIs may be on an adhesive sheet with die cut and the IRTIs may be provided by a vendor.

At step 1206, a version and an error level for an optical code selected, such as a version 6 QR code with a module size of 0.75 mm and centered within a 40 mm×40 mm array, such as what is shown in FIG. 4 above.

At step 1208, a layout for integrating the QR code and the IRTIs similar to the creation of an ISTT by integrating an IRTI with a QR code discussed above. For example, a round irreversible thermal threshold indicator with a diameter of 12 mm may be used, so the QR code may be on the IRTIs with a diameter of 12 mm in a 40 mm×40 mm array.

At step 1210, the ISTTs is registered with a product SKU. In this example, the ISSTs may be registered as shown below:

Product Type: MobyGrape 2019 Russian River Pinot Noir
Product SKU: 1630616
QR Code Version: 6
Error Correction Level: M
ISTT IRTI Array: Count: 1
{Placement: Center 20, 20 modules; Radius: 8 modules; Activated Color: #1223A2; Non-Activated Color: #121212; Substrate Color: #fefefe; Type: Thermal; Trigger: Max 27.777 C}

At step 1212, the ISTTs are printed and applied to the bottle.

In certain examples, multiple (e.g., 100 per sheet) IRTIs may be printed by an inkjet printer, and the ISTT manufacturing client, which is discussed above, may be used to generate, encode, and print the QR code which overlays the ISTT based on the layout of the IRTIs as discussed above in FIGS. 8 and 10.

After printing the ISTTs, completed sheets of ISTTs are sent for labelling and the ISTTs are applied on the labels. The ISTTs may be scanned with a mobile device running a version of ISTT manufacturing client, and each UUID may be registered with the ISTT service, as discussed above.

In one exemplary use case, where a consumer buys the bottle of Pinot Noir described above, the customer uses an image capture device (e.g., a phone camera) to scan the label on the bottle of Pinot Noir and learn whether it has been subjected to any adverse environmental factors while, simultaneously be presented with notes from the wine manufacturer.

In another use case, the manufacturer can query the system and see the number of individual product SKUs were delivered and examined by customers using the composite tag. For example, the manufacturer may see which numbers of products were stored and transported properly and improperly during transport through the supply chain.

The techniques and methods described above may be implemented as one or more components of an integrated system. For example, the system may include an ISTT manufacturing client configured to generate a universal unique identifier (UUID) and a reference, or a URL to a service to process the UUID that can be scanned and rendered on a client device (e.g., a mobile phone).

The system may also include an ISTT service configured to receive and respond to request based on a URL, the URL being a link to a web service that serves data such as a UUID identifying one or more IRTIs, the types of each IRTI expected to be on the label, the position(s) of each IRTI within the QR code, the SKU or SKUs associated with the IRTI, and the web address of the ISTT server further configured to store the URL link and one or more data elements associated with the product.

The ISTT service may also receive and respond to requests to the URL which links an individual IRTI tag with the product, object or device that the IRTI is attached to, and the ISTT service is configured to store the link. In such cases, the link may be associated with the set of environmental thresholds, constraints, or characteristics specific to a class of products, objects, or devices.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or other non-transitory storage medium, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The techniques and system architecture described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

It is to be understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Obviously, numerous modifications and variations are possible in light of the above teachings. It is therefore to be understood that within the scope of the appended claims, embodiments of the present disclosure may be practiced otherwise than as specifically described herein.

What is claimed is:

1. A method for manufacturing a device for monitoring an object, comprising:
    forming a first layer by printing a first array of indicators on a substrate;
    forming a second layer by printing a second array of indicators on the second layer;
    depositing a color development layer on the second layer, the second layer isolating the first layer and the color development layer; and
    printing an optically coded layer on the color development layer, the optically coded layer including an optical coded tag encoding one or more identifiers for the object.

2. The method of claim 1, wherein the first layer contacts the color development layer after the device reaches a threshold temperature.

3. The method of claim 2, wherein the first layer contacting the color development layer changes color of the first layer.

4. The method of claim 1, wherein the first layer contacts the color development layer after the device reaches a threshold humidity.

5. The method of claim 1, wherein the first layer contacts the color development layer after the device is exposed to light for a threshold of time.

6. The method of claim 1, wherein the first array of indicators change color after the first array of indicators reaches a first threshold of temperature.

7. The method of claim 1, wherein the second array of indicators change color after the second array of indicators reaches second threshold of temperature.

8. The method of claim 1, wherein the first array of indicators change color after the first array of indicators is exposed to light.

9. The method of claim 1, wherein the second array of indicators change color after the second array of indicators is exposed to light.

10. The method of claim 1, wherein the first array of indicators change color after the first array of indicators reaches a first threshold of humidity.

11. The method of claim 1, wherein the second array of indicators change color after the second array of indicators reaches second threshold of humidity.

12. The method of claim 1 wherein the one or more identifiers for the object include identifiers that are unique to the individual object.

13. The method of claim 1 wherein the optically coded tag is printed on the color development layer in a pattern such that as not to interfere with the operation first or second array of indicators.

14. A method for retrieving information about a product, the method comprising:
    retrieving an image comprising an optically encoded tag and one or more irreversible threshold indicators;
    sensing a characteristic of at least one of the irreversible threshold indicators, the characteristic indicting a state change of an environment to which the product was exposed;
    resolving data encoded in the optically encoded tag to instructions to query a web service, wherein the web service provides data regarding the product in response to receiving the query; and
    presenting the data regarding the product combined with information regarding the impact of the state change on the product.

15. The method of claim 14 wherein the optically encoded tag comprises a QR code.

16. The method of claim 15 wherein the irreversible threshold indicators are positioned within the QR code.

17. The method of claim 16 wherein the positioning of the irreversible threshold indicators such as not to interfere with data encoded into the QR code.

18. The method of claim 14 wherein the characteristic of one or more irreversible threshold indicators comprises a color change.

19. The method of claim 18 wherein the color change is brought about when the product on which the irreversible threshold indicators are placed encounter environmental conditions outside of a defined threshold.

20. The method of claim 19 wherein the defined threshold comprises one or more of a temperature range, a humidity range, and exposure to ultraviolet light.

21. The method of claim 14 wherein the data regarding the product comprises one or more of (i) a type of irreversible threshold indicators included with the QR code, and (ii) one or more locations within the QR code where the irreversible threshold indicators are located.

22. The method of claim 14 wherein the information regarding the impact of the state change on the product comprises a set of colors of at least one of the irreversible threshold indicators and an product state associated with each color.

23. A system for tracking and monitoring environmental effects on a product, the system comprising:
    a composite tag comprising an optically encoded tag and one or more irreversible threshold indicators that, when scanned by a scanning device, resolves to a uniform resource locator, wherein the uniform resource locator comprises a data request comprising at least a web address of a central data server and a unique product identifier;
    a data service addressable by the uniform resource locator operating at the central data server that receives the data request from the scanning device and in response thereto retrieves, from a central data store, information about the product, wherein the information about the product comprises an indication as to whether the product has been exposed to an adverse environmental effect based at least in part on the state of the irreversible threshold indicator.

24. The system of claim 23 wherein the optically encoded tag comprises a QR code.

25. The system of claim 23 wherein the irreversible threshold indicators are positioned within the QR code.

26. The system of claim 25 wherein the positioning of the irreversible threshold indicators such as not to interfere with data encoded into the QR code.

27. The system of claim 23 wherein the information about the product comprises a color range of the irreversible threshold indicator.

28. The system of claim 27 wherein the color range represents changes to a color of the irreversible threshold indicator brought about when the product on which the irreversible threshold indicator encounters environmental conditions outside of a defined threshold.

29. The system of claim 28 wherein the defined threshold comprises one or more of a temperature range, a humidity range, and exposure to ultraviolet light.

30. The system of claim 23 wherein the data regarding the product comprises one or more of (i) a type of irreversible threshold indicators included with the QR code, and (ii) one or more locations within the QR code where the irreversible threshold indicators are located.

* * * * *